US009462005B2

(12) United States Patent
Abraham et al.

(10) Patent No.: US 9,462,005 B2
(45) Date of Patent: Oct. 4, 2016

(54) SYSTEMS AND METHODS FOR BROADCAST WLAN MESSAGES WITH MESSAGE AUTHENTICATION

(71) Applicant: QUALCOMM Incorporated, San Diego, CA (US)

(72) Inventors: Santosh Paul Abraham, San Diego, CA (US); George Cherian, San Diego, CA (US); Jouni Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/284,785

(22) Filed: May 22, 2014

(65) Prior Publication Data

US 2014/0351932 A1 Nov. 27, 2014

Related U.S. Application Data

(60) Provisional application No. 61/827,490, filed on May 24, 2013.

(51) Int. Cl.
*H04L 29/06* (2006.01)
*H04L 12/18* (2006.01)
*H04L 9/32* (2006.01)

(52) U.S. Cl.
CPC .......... *H04L 63/123* (2013.01); *H04L 9/3242* (2013.01); *H04L 12/1863* (2013.01)

(58) Field of Classification Search
None
See application file for complete search history.

(56) References Cited

U.S. PATENT DOCUMENTS

| 8,689,283 | B2 * | 4/2014 | Tie ........................... H04L 63/20 455/466 |
| 2002/0057662 | A1 * | 5/2002 | Lim ..................... H04W 76/002 370/338 |
| 2005/0129236 | A1 | 6/2005 | Sharma |
| 2009/0300358 | A1 * | 12/2009 | Pang ..................... H04L 9/0891 713/171 |
| 2011/0194697 | A1 * | 8/2011 | Pang ..................... H04L 9/0833 380/279 |
| 2011/0208971 | A1 | 8/2011 | Bhattacharya et al. |
| 2013/0016838 | A1 * | 1/2013 | Hu ........................ H04L 63/065 380/255 |
| 2013/0173924 | A1 | 7/2013 | Kim et al. |
| 2013/0195001 | A1 * | 8/2013 | Liu ......................... H04L 69/04 370/312 |
| 2014/0036775 | A1 | 2/2014 | Asterjadhi et al. |
| 2014/0351598 | A1 | 11/2014 | Abraham et al. |
| 2015/0381764 | A1 * | 12/2015 | Nguyen ................ H04L 67/322 709/226 |

OTHER PUBLICATIONS

Gong L. et al., "Multicast Security and Its Extension to a Mobile Environment", Wireless Networks, ACM, 2 Penn Plaza, Suite 701—New York USA, vol. 1, No. 3, Oct. 1, 1995, pp. 281-295, XP000538241, ISSN: 1022-0038, DOI: 10.1007/BF01200847.

(Continued)

*Primary Examiner* — Kaveh Abrishamkar
(74) *Attorney, Agent, or Firm* — Knobbe Martens Olson & Bear LLP

(57) ABSTRACT

Systems, methods, and devices for multicast wireless local area network messages with message authentication are contained herein. The method includes determining a message integrity check value for each of a plurality of wireless devices. The method further includes transmitting a multicast packet to each of the plurality of devices on a wireless local area network, the multicast packet including an indication of each of the plurality of devices and the message integrity check value for each of the plurality of devices.

24 Claims, 9 Drawing Sheets

(56) References Cited

OTHER PUBLICATIONS

International Search Report and Written Opinion—PCT/US2014/039301—ISA/EPO—Sep. 3, 2014.

Pang L. et al., "Improved multicast key management of Chinese wireless local area network security standard", IET Communications, The Institution of Engineering and Technology, Michel Faraday House, Six Hills Way, Stevenage, Herts. SG1 2AY, UK, vol. 6, No. 9, Jun. 14, 2012, pp. 1126-1130, XP006042786, ISSN: 1751-8628, DOI: 10.1049/IET-COM.2010.0954.

Szilagy C. et al., "Flexible multicast authentication for time-triggered embedded control network applications", Dependable System &Networks, 2009. DSN'09. IEEE/IFIP International Conference on, IEEE, Piscataway, NJ, USA, Jun. 29, 2009, pp. 165-174,XP031533174,ISBN: 978-1-4244-4422-9.

* cited by examiner

SYSTEMS AND METHODS FOR BROADCAST WLAN MESSAGES WITH MESSAGE AUTHENTICATION

CLAIM OF PRIORITY UNDER 35 U.S.C. §119

The present Application for patent claims priority to Provisional Application No. 61/827,490 entitled "SYSTEMS AND METHODS FOR BROADCAST WLAN MESSAGES WITH MESSAGE AUTHENTICATION" filed May 24, 2013, and assigned to the assignee hereof and hereby expressly incorporated by reference herein.

BACKGROUND

1. Field

The present application relates generally to wireless communications, and more specifically to systems, methods, and devices for broadcast wireless local area network (WLAN) messages with message authentication.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet. In some cases, a broadcast packet may be transmitted, in which the same data is transmitted simultaneously to a number of devices in the wireless network.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the overhead in transmitting payloads in data packets.

One aspect of the disclosure provides a method of wireless communication comprising determining a message integrity check value for each of a plurality of wireless devices; and transmitting a multicast packet to each of the plurality of devices on a wireless local area network, the multicast packet including an indication of each of the plurality of devices and the message integrity check value for each of the plurality of devices.

The indication of each of the plurality of devices may include at least one of an association identification and a media access control address for each of the plurality of devices. Determining the message integrity check value may include determining a message integrity check value based on one or more of a frame header of the multicast packet, data in the multicast packet, the indication of one of the plurality of devices, and a pairwise transient key and pseudo random noise sequence number in a counter mode cipher block chaining message authentication code protocol header of the multicast packet. The message integrity check value for each of a plurality of wireless devices may include a shortened message integrity check value of fewer than eight octets. The multicast packet may include a data length field within a frame body of the multicast packet. The multicast packet may include a counter mode cipher block chaining message authentication code protocol header with a flipped reserved bit or flipped reserved combination of bits, the flipped reserved bit or flipped reserved combination of bits configured to allow the plurality of devices to recognize the multicast packet as a multicast packet with sender authentication.

The method may also include receiving an indication from a device of the plurality of devices indicating an error in one or more message integrity check values in a second multicast packet received by the device; and transmitting a message to one or more devices indicating that the device has discovered the error in one or more message integrity check values. The message may include instructions to the one or more devices to disable a multicast packet service in the network, or may include instructions to the one or more devices to alter a unicast key of the one or more devices. Determining the message integrity check value may include generating a first message integrity check value by encrypting data in the multicast packet with a group temporal key, and then determining a message integrity check value for each of a plurality of wireless devices based on the first message integrity check value.

Another aspect of the disclosure provides a wireless communication apparatus comprising a transmitter configured to determine a message integrity check value for each of a plurality of wireless devices; and transmit a multicast packet to each of the plurality of devices on a wireless local area network, the multicast packet including an indication of each of the plurality of devices and the message integrity check value for each of the plurality of devices.

In one aspect, the disclosure provides a wireless communication apparatus comprising means for determining a message integrity check value for each of a plurality of wireless devices; and means for transmitting a multicast packet to each of the plurality of devices on a wireless local area network, the multicast packet including an indication of each of the plurality of devices and the message integrity check value for each of the plurality of devices.

In another aspect, the disclosure provides a non-transitory, computer readable medium comprising instructions that when executed cause a processor in a device to perform a method for wireless communication, the method comprising determining a message integrity check value for each of a plurality of wireless devices; and transmitting a multicast packet to each of the plurality of devices on a wireless local area network, the multicast packet including an indication of each of the plurality of devices and the message integrity check value for each of the plurality of devices.

DETAILED DESCRIPTION

Figure 1:
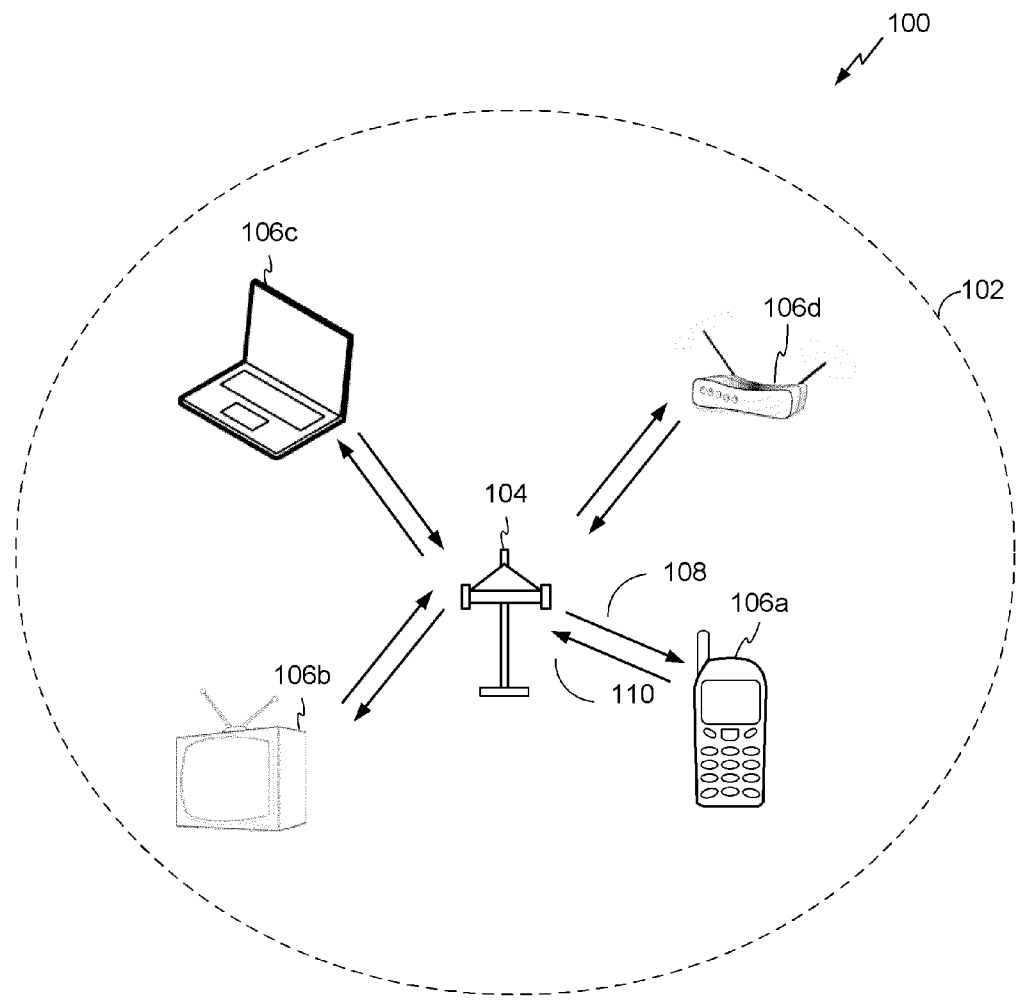
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., an IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium. As discussed above, certain of the devices described herein may implement an IEEE 802.11 standard, for example.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA (Orthogonal frequency-division multiple access) techniques. If this is the case, the wireless communication system 100 may be referred to as an OFDM/OFDMA system. Alternatively, signals may be sent and received between the AP 104 and the STAs 106 in accordance with CDMA (Code division multiple access) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
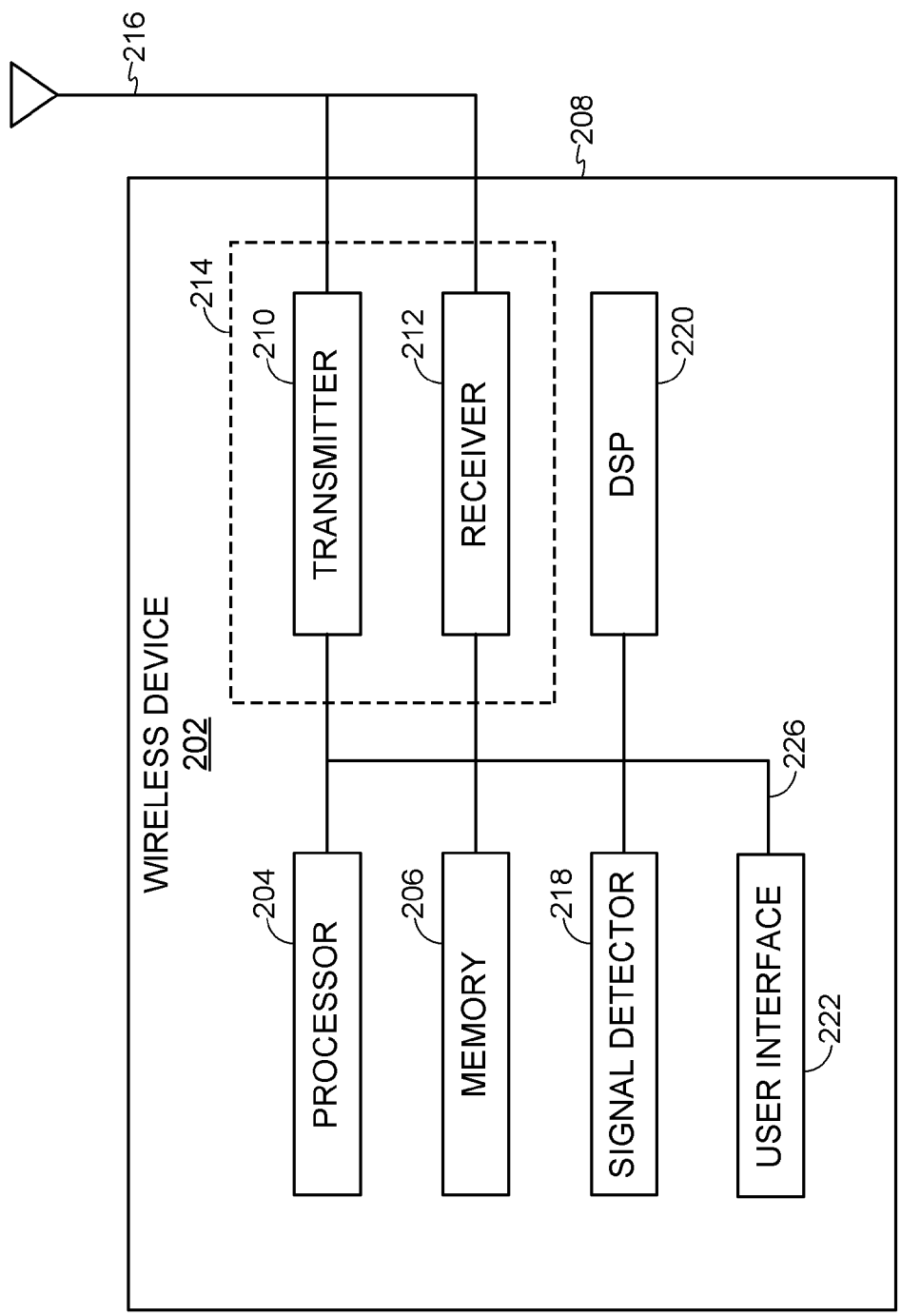
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In some aspects, it may be desirable to send multicast or broadcast frames from the AP 104 to a number of STAs 106 simultaneously. For example, in a classroom setting, it may be desirable for a teacher to send broadcast packets to all students at once, as each student may require the same instructions or materials from the teacher. There are also a number of other settings in which broadcast or multicast packets may be desirable in a WLAN network, such as an IEEE 802.11 protocol network. For example, broadcast or multicast packets may also be used for live streaming, emergency messaging, advertising, or other applications.

However, the current Hotspot 2.0 standard strongly discourages multicast frames, as these frames may not include sufficient security features. One current issue with multicast frames is that the current protocols for multicast packets may be vulnerable to a "Hole 196 attack," in which a STA 106 may masquerade as the AP 104 and send a multicast frame. Such vulnerabilities may exist because a symmetric key is used in current multicast frames, which means that STAs 106 that are a part of the network may be able to masquerade as the AP 104 in sending a multicast frame, and other STAs 106 will not be able to tell the difference between a multicast frame sent by the AP 104 or sent by a STA 106 masquerading as the AP 104. Such a masquerading STA 106 may, for example, be used for Address Resolution Protocol (ARP) poisoning, in which a masquerading STA 106 associates its own MAC address with that of the AP 104, in order to intercept data frames from other STAs 106. Thus, it may be beneficial to provide a suitable multicast format in order to allow STAs 106 to verify that a sender of a multicast frame is the AP 104 and to enable more secure broadcast and multicast packets in a WLAN.

Figure 3:
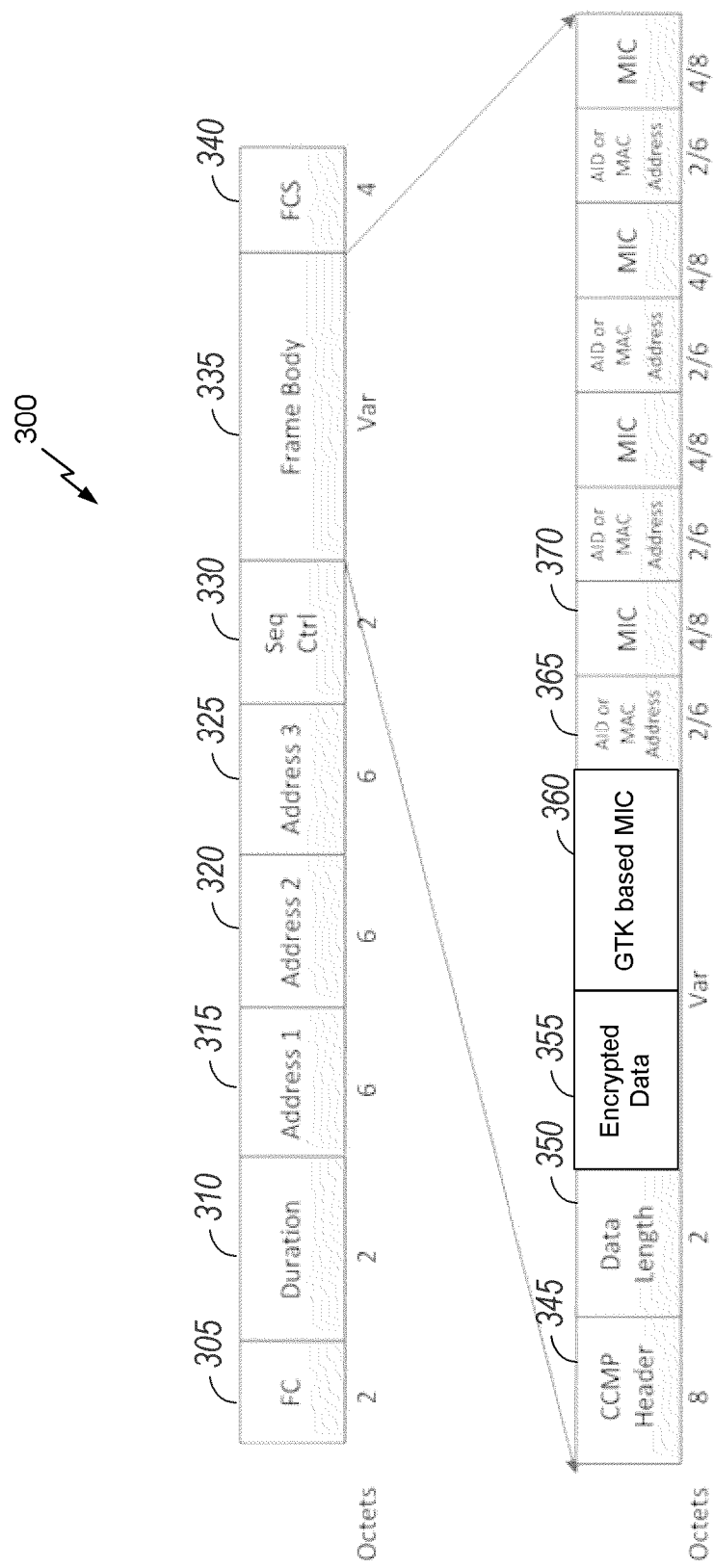
FIG. 3 illustrates a multicast frame format packet with message authentication.

FIG. 3 illustrates a multicast frame format packet 300 with increased security features. For example, this packet 300 may be used for any multicast or broadcast frames sent from the AP 104 to the STA 106. For example, this packet 300 may be used for data frames and for management frames. In some aspects, the number of octets listed for each portion of the packet 300 may vary. For example, the listed number of octets for each portion of the packet 300 may be merely exemplary.

The multicast frame format packet 300 may include a two-octet Frame Control 305 field, a two-octet Duration ID 310 field, and three six-octet Address fields 315, 320, 325. The multicast frame format packet 300 may further include a two-octet Sequence Control field 330, a frame body 335, and a four-octet Frame Check Sequence (FCS) 340. In some aspects, each of these portions of the frame format 300, other than the frame body, may be similar to previous types of frames. The frame body 335 may include a Counter Cipher Mode with Block Chaining Message Authentication Code Protocol (CCMP) Header 345, a data length 350, encrypted data 355, a Group Temporal Key-based (GTK-based) MIC (message integrity code) 360, and two or more AID or MAC (media access control) Addresses 365 and MICs 370s.

In some aspects, the CCMP Header 345 and the encrypted data 355 may be created based upon the GTK, as in a usual packet. The format 300 may vary from an ordinary frame, however, in a number of ways. First, in order to provide additional security, for each STA 106 that the frame is intended for, an AID or MAC address 365 of the STA 106 may be transmitted, along with an Message Integrity Check (MIC) 370 for each of the STAs. These elements may normally be transmitted in unicast packets sent to the STA 106. In some aspects, the MIC 370 for each STA 106 may be generated based upon frame headers, data, the STA's 106 MAC address and/or AID, and the STA pairwise transient key (PTK) and PN sequence number in the CCMP header 345. In some aspects, however, it may be beneficial to generate the MIC based instead on the PN sequence number in a CCMP header 345, and the MIC generated for the GTK. Unlike previous formats of multicast frames, which included only symmetric keys, including such a per STA MIC 370 may prevent Hole 196 attacks. Thus, adding an AID or MAC Address 365 and a MIC 370 for each STA receiving the multicast packet 300 may allow increased security in a multicast or broadcast packet.

In some aspects, the frame body 335 of the packet 300 may include a data length field 350. Such a data length field 350 may not be needed in other packet formats, as the data length of a packet may be inferred based upon the duration field 310 of a unicast packet. However, in a multicast packet 300, the duration of the data may not be inferred from the duration field 310, as the multicast packet 300 may have a variable number of AID or MAC Address 365 and a variable number of MICs 370. Thus, an additional data length field 350 may be used to indicate the length of the data included in the multicast packet.

In some aspects, the CCMP Header 345 may include a number of reserved bits. In some aspects, in order to indicate to STAs that a packet is a multicast packet containing per STA MICs, one of the reserved bits may be used to indicate the encrypted MPDU with the format of packet 300. For example, the value of a reserved bit may be altered in order to indicate the encrypted MPDU with the format of packet 300. In some aspects, a combination of bits in a CCMP header 345 may be reserved, and a reserved combination of bits may be chosen in order to indicate to STAs 106 that the packet is an encrypted multicast packet according to the format of packet 300. For example, the value of a combination of bits, such as a reserved combination of bits, may be altered in order to indicate that the packet is an encrypted multicast packet according to the format of packet 300. By altering a reserved bit or a reserved combination of bits, a packet may indicate to receiving devices that the packet includes the security features and/or encryption discussed herein. In some aspects, one disadvantage of the per STA MIC approach in FIG. 3 may be that as multicast packets are transmitted to a larger number of packets, more per STA AID or MAC Addresses 365 are needed, and more per STA MICs 370. Thus, as a packet is transmitted to a large number of STAs, and increasing amount of overhead information may need to be transmitted with each packet.

In some aspects, one possible method to reduce the overhead produced by including the per STA MICs 370 in each packet may include reducing the size of each MIC. For example, in some aspects, each per STA MIC 370 may be 8 octets. Such a size may allow $2^{8*8}$ different values. This may make it very difficult for a masquerading STA to correctly guess the proper value of the STA MIC 370 while transmitting a packet pretending to be the AP 104. However, including eight octet MICs for each STA may add a significant amount of overhead to each packet, especially when the multicast packet 300 is transmitted to a large number of STAs 106. Thus, providing a shorter MIC 370 may be advantageous. However, a shorter MIC 370 may normally have the disadvantage of being easier for a masquerading device to guess. One method which may be used to cure this deficiency in a multicast packet 300 is to provide a shorter MIC 370 to each of the STAs 106 receiving the packet, and to allow a mechanism whereby a STA 106 may alert other STAs 106 in the event that the STA's 106 MIC 370 is not correct.

For example, any STA 106, upon receiving a multicast frame with a MIC 370 that is erroneous may transmit a message to the AP 104 to inform it that a rogue entity is transmitting multicast frames. In some aspects, a STA 106 may alert the AP 104 if it receives a packet containing a MIC 370 with a value different than the expected value. The AP 104 may be configured to determine whether this error was due to an error in receiving a packet by the STA 106, or whether the packet itself was not sent by the AP 104 and may have been sent by a rogue entity such as a masquerading STA. The AP 104 may then undertake a number of actions upon learning of such a rogue entity. For example, the AP 104 may stop multicast service in the BSS. The AP 104 may be configured to broadcast a message informing all devices that a rogue device is transmitting multicast frames. The message may include some parameters of the frame, in order to allow devices to discard the frames from the rogue device. The AP 104 may also change the unicast keys of devices in the BSS. For example, the AP 104 may instruct devices to change keys, such as pairwise transient keys (PTKs) which are used by the device to determine whether a message is sent by the AP 104. For example, if a device is masquerading as the AP 104, that device may have successfully transmitted a MIC 370 to some of the devices in the network. Accordingly, it may be beneficial if each device alters its unicast keys, such that the masquerading device will be unable to send those devices correct MIC 370 values after the change in unicast keys, as the MIC 370 for each individual device may be based, at least in part, on a unicast key of that device.

In some aspects, security of the network may be improved by providing a shorter MIC 370 to each STA 106, but also providing a mechanism whereby STAs 106 may alert the AP 104 if an erroneous MIC 370 is received. This may also reduce overhead, compared to providing a longer MIC 370 to each STA 106, without the reactive mechanism to alert the AP 104. For example, if five STAs 106 each receive a two-octet MIC 370, there may be $2^{8*2*5}$ different possible combinations of the five two octet MIC values 370. This is higher than the number of different values of a single eight octet MIC, which is $2^{8*8}$. Thus, it may be beneficial to provide MICs 370 which are shorter than eight octets, and such a reduction in MIC size may not result in less security than a larger MIC size.

Figure 4:
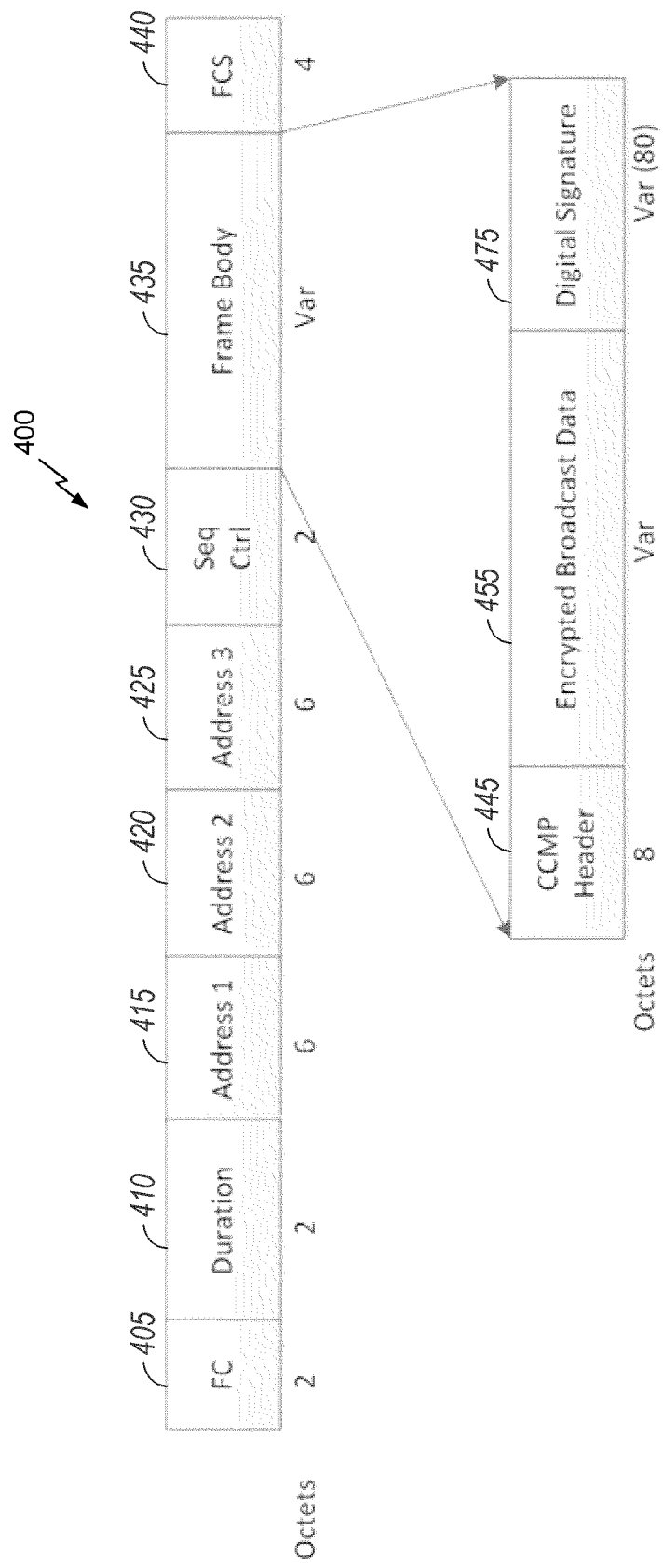
FIG. 4 illustrates another multicast frame format packet with message authentication.

FIG. 4 illustrates another multicast frame format packet 400 with increased security features. For example, this packet 400 may be used for all frames sent from the AP 104 to the STA 106. For example, this packet 400 may be used for both data frames and for management frames. In some aspects, the number of octets listed for each portion of the packet 400 may vary from the listed number, which may be merely exemplary.

The multicast frame format packet 400 may include a two-octet Frame Control 405 field, a two-octet Duration ID 410 field, and three six-octet Address fields 415, 420, 425. The packet 400 may further include a two-octet Sequence Control field 430, a frame body 435, and a four-octet Frame Check Sequence (FCS) 440. In some aspects, each of these portions of the frame format 400, other than the frame body, may be similar to previous types of frames. The frame body 435 may include a Counter Cipher Mode with Block Chaining Message Authentication Code Protocol (CCMP) Header 445, encrypted data 455, and a digital signature 475.

As with the packet 300, the packet 400 may be similar to previous packets in all portions of the packet excluding the frame body 435. As with the packet 300, the CCMP Header 445 may be configured to include an indication to STAs 106 that the packet is a multicast packet 400. For example, the CCMP Header 445 may include a reserved bit that is flipped from its reserve value, in order to indicate that the packet is a multicast packet 400. In some aspects, the CCMP Header 445 may include a reserved combination of bits, in order to indicate that a packet is a multicast packet 400. In some aspects, unlike packet 300, a data length field may not be needed in packet 400, as the digital signature 475 may be defined as some fixed length. Thus, the duration field 410 alone may be sufficient to indicate to STAs 106 the duration of the encrypted broadcast data 455.

In order to ensure that the packet 400 has been transmitted by the AP 104 rather than a masquerading STA 106, the packet 400 may include a digital signature 475. In some aspects the digital signature 475 may be based upon a public key/private key scheme. In this scheme, a per packet-based digital signature 475 may be used. This may include hashing the data encrypted with GTK data, and then computing a digital signature 475 based on the hashed value of the data. In some aspects, the digital signature 475 may be computed based upon either the data, or a hash of the data. In some aspects, the digital signature 475 may also be based upon a sequence (PN) number in the counter mode cipher block chaining message authentication code protocol (CCMP) Header 445. In some aspects, the digital signature 475 may also be generated based on the MIC generated by the GTK. This may be beneficial in some aspects, as this may avoid computing the digital signature 475 for the entire data, which may be more complex to compute.

The digital signature 475 may then be appended to the frame. This approach may offer some advantages over other approaches. For example, this approach may require only a single digital signature 475 of a fixed length, which may be smaller than appending a number of individuals MICs for each STA 106, as in packet 300. Similarly, it may be simpler to computer a single signature than computing individual MICs, especially when the number of STAs is large. However, this approach may also have some disadvantages. For example, asymmetric encryption, such as that used in a public/private key system, may be more computationally complex. This may make it more difficult for packet-by-packet verification for the STAs. Additionally, generation of the public/private key pair may be difficult. In this situation, the AP 104 may act as its own certificate authority, and may have to dynamically generate public/private key pairs. This may be computationally complex for the AP. Each key pair may be configured to expire after a certain time period, in order to maintain security, which may require the generation of a new public/private key pair.

One type of encryption which may be used in packet 400 is elliptic curve cryptography (ECC). ECC may be used to generate the digital signature 475, and may over advantages over other techniques. For example, ECC may require a low amount of computational overhead. The generation of a digital signature 475 using ECC may involve methods which may be used in other areas of cryptography. For example, Elliptic Curve Digital Signature Algorithm (ECDSA), as described in the IEEE 1363 standard for public key encryption, may be used to encrypt the digital signature 475. In some aspects, the digital signature 475 may be generated based, at least in part, on techniques such as those disclosed in NIST Special Publication 800-56A, "Recommendation for Pair-Wire Key Establishment Schemes Using Discrete Logarithm Cryptography," and FIPS Publication 186-3, "Digital Signature Standard (DSS)," both of which are incorporated by reference herein. In some aspects, each public key/private key pair may include an expiry time, which may be provided in terms of the AP's 104 timer synchronization function (TSF).

In order to use a public key/private key encryption method, the public key must be provided to the STAs 106 in the network. In providing public keys, each STA 106 may be configured to verify the public key that it is using has been sent by the AP 104. For example, the AP 104 may transmit the public key to the STA 106 in an encrypted unicast frame, which is encrypted using the STA's 106 PTK. This may allow the STA 106 to ensure that the sender of the key was actually the AP 104.

Figure 5A:
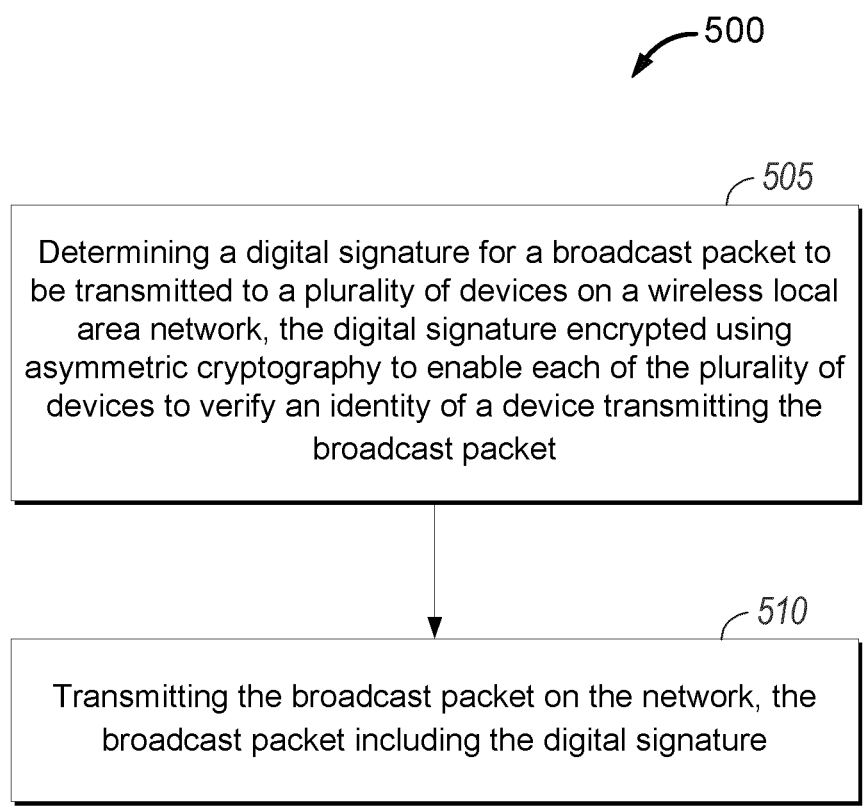
FIG. 5A shows a flow chart of an exemplary method for transmitting a packet with message authentication.

FIG. 5A shows a flow chart of an exemplary method for transmitting a packet with message authentication. In some aspects, this method may be done by an AP 104 on a WLAN network when sending a broadcast packet.

At block 505, the AP 104 determines a digital signature for a broadcast packet to be transmitted to a plurality of devices on a wireless local area network, the digital signature encrypted using asymmetric cryptography to enable each of the plurality of devices to verify an identity of a device transmitting the broadcast packet. In some aspects, the digital signature may be encrypted using elliptic curve cryptography. In some aspects, the means for determining may comprise a processor or a transmitter. In some aspects, the method further comprises generating a public key/private key pair, where the public key may be used to decrypt messages which are encrypted using the private key. In some aspects, these public keys may be transmitted to individual wireless devices. In order to prevent security attacks on transmissions of public keys, such as fake keys being transmitted by other devices masquerading as the AP, it may be desirable to send public keys to each wireless device individually, rather than in a broadcast packet. This may be especially useful when sending a device a first public key. In some aspects, the AP may be configured to generate public key/private key pairs on some time interval, and to transmit new public keys to wireless devices after a new key pair has been generated. These transmissions of updated public keys may be transmitted to devices having the previous public key in a broadcast packet, as described herein. However, because a new device to the network may not be able to authenticate such a broadcast packet, it may be useful to send a public key to new devices on the network individually.

In some aspects, each of the public/private keys may have an expiry time. For example, this expiry time may coincide with a time at which a new public/private key pair may be generated and transmitted to the devices in the network. This expiry time may be transmitted to the devices in a number of ways. For example, this expiry tie may be transmitted to each of the devices in the network as part of a timer synchronization function.

At block 510, the AP 104 transmits the broadcast packet on the network, the broadcast packet including the digital signature. In some aspects, the digital signature may be included after encrypted data in a frame body of the packet. In some aspects, the means for transmitting the packet may comprise a transmitter.

Figure 5B:
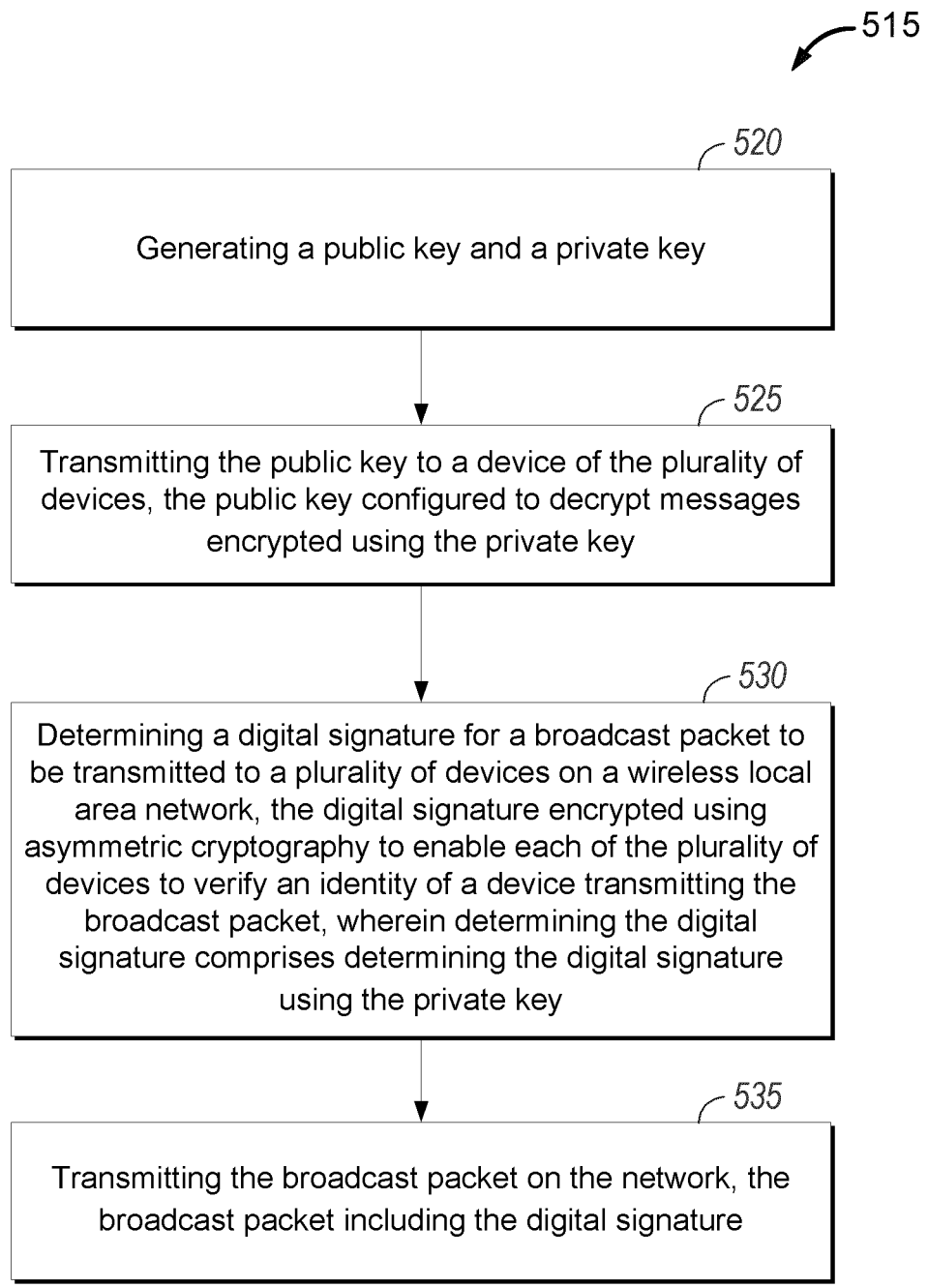
FIG. 5B shows a flow chart of another exemplary method for transmitting a packet with message authentication using a public key and a private key.

FIG. 5B shows a flow chart of another exemplary method for transmitting a packet with message authentication using a public key and a private key. In some aspects, this method may be done by an AP 104 on a WLAN network when sending a broadcast packet.

At block 520, the method 515 includes generating a public key and a private key. For example, the public key and the private key may be generated based on elliptic curve cryptography, or another form of asymmetric cryptography. In some aspects, the means for generating a public key and a private key may include a processor.

At block 525, the method 515 includes transmitting the public key to a device of the plurality of devices, the public key configured to decrypt messages encrypted using the private key. For example, the public key and the private key may be a key pair, such that the public key may be used to decrypt messages encrypted using the private key. However, due to the nature of asymmetric cryptography, the public key may not be able to encrypt messages, as this may require the private key. In some aspects, the means for transmitting the public key may include a transmitter. In some aspects, transmitting the public key may also include transmitting an expiry time for the public key, after which the public key may not be used. For example, the expiry timer may be included in a timer synchronization function.

At block 530, the method 515 includes determining a digital signature for a broadcast packet to be transmitted to a plurality of devices on a wireless local area network, the digital signature encrypted using asymmetric cryptography to enable each of the plurality of devices to verify an identity of a device transmitting the broadcast packet, wherein determining the digital signature comprises determining the digital signature using the private key. In some aspects, the means for determining a digital signature may include a processor.

At block 535, the method 515 includes transmitting the broadcast packet on the network, the broadcast packet including the digital signature. In some aspects, the means for transmitting the broadcast packet may include a transmitter.

Figure 6:
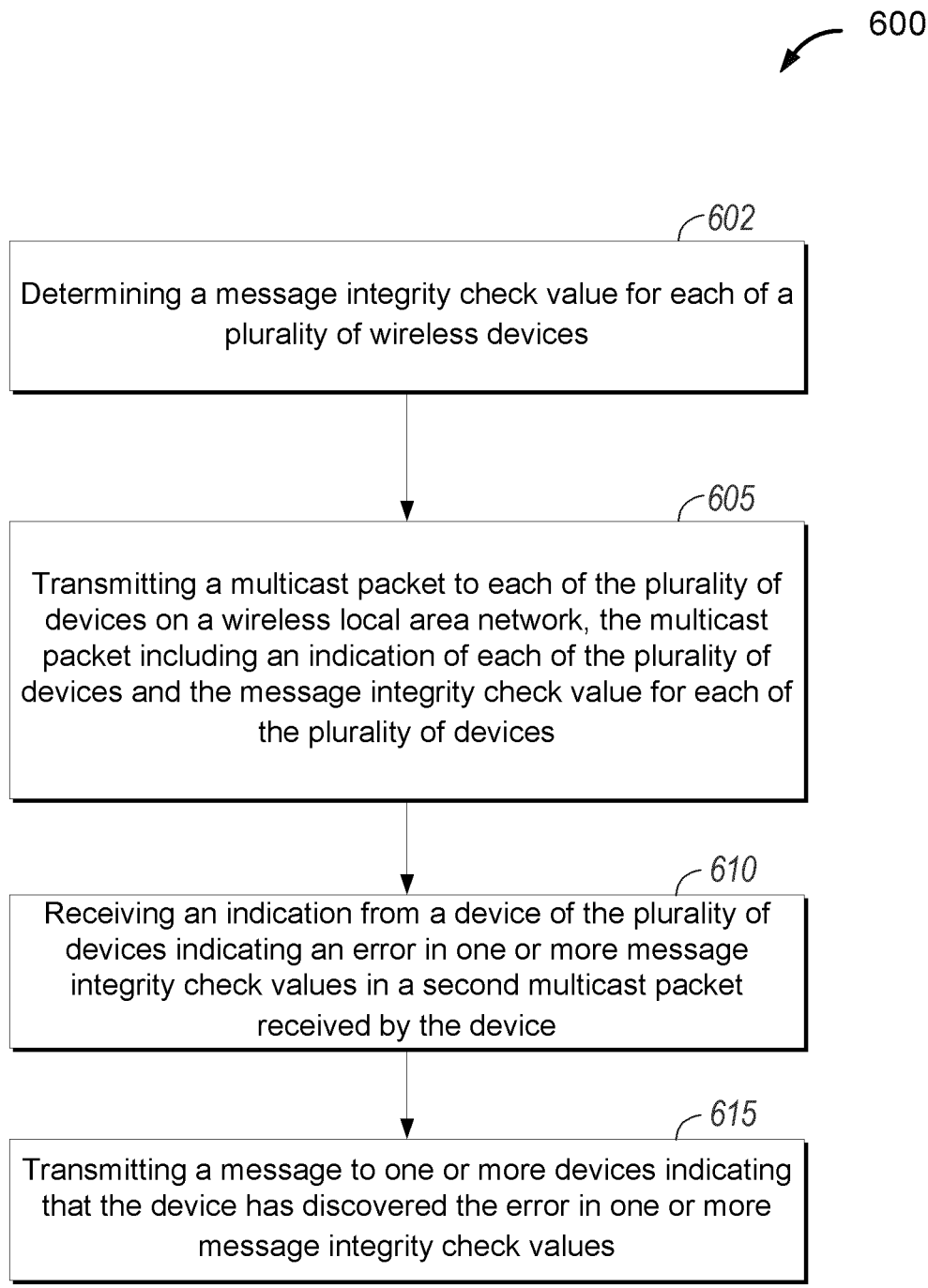
FIG. 6 shows a flow chart of another exemplary method for transmitting a packet with message authentication.

FIG. 6 shows a flow chart of another exemplary method for transmitting a packet with message authentication. In some aspects, this method may be done by a wireless device, such as an AP 104 which is on a network in communication with one or more STAs 106.

At block 602, the AP 104 determines a message integrity check value for each of a plurality of wireless devices. For example, the AP 104 may wish to transmit a multicast packet to each of the plurality of wireless devices. Accordingly, in order to allow those devices to verify the sender of the multicast message, the AP 104 may determine a MIC value for each of the devices. In some aspects, the means for determining the MIC value may include a processor.

At block 605, the AP 104 transmits a multicast packet to each of the plurality of devices on a wireless local area network, the multicast packet including an indication of each of the plurality of devices and the message integrity check value for each of the plurality of devices. In some aspects, the means for transmitting may include a transmitter. In some aspects, the indication may be one or more MAC Addresses or AIDs identifying each device that the multicast packet is intended for. In some aspects, the message integrity check value may be a shortened message integrity check of fewer than eight octets. For example, the use of such a shortened value may allow the portion of the packet containing the MICs to be transmitted in less time, and thus, have less overhead than using a MIC value with a larger size.

At block 610, the AP 104 receives an indication from a device of the plurality of devices indicating an error in one or more message integrity check values in a second multicast packet received by the device. In some aspects, this indication may be used by the AP 104 to determine whether other devices may be masquerading as the AP 104. For example, this indication may be received when a device determines that a given message integrity check value in a packet is not the value that it should be. This may mean that a device other than the AP 104 transmitted the packet. In some aspects, the means for receiving may include a receiver.

At block 615, the AP 104 transmits a message to one or more devices indicating that the device discovered the error in one or more message integrity check values in the packet. For example, if the AP 104 determines that the packet received by the device in block 610 was not sent by the AP 104, the AP 104 may alert other devices of a masquerading STA, inform other devices to disregard the masquerading packet, turn off multicast service in the BSS, and/or alter unicast keys of one or more devices in the network. In some aspects, the means for transmitting may include a transmitter.

Figure 7:
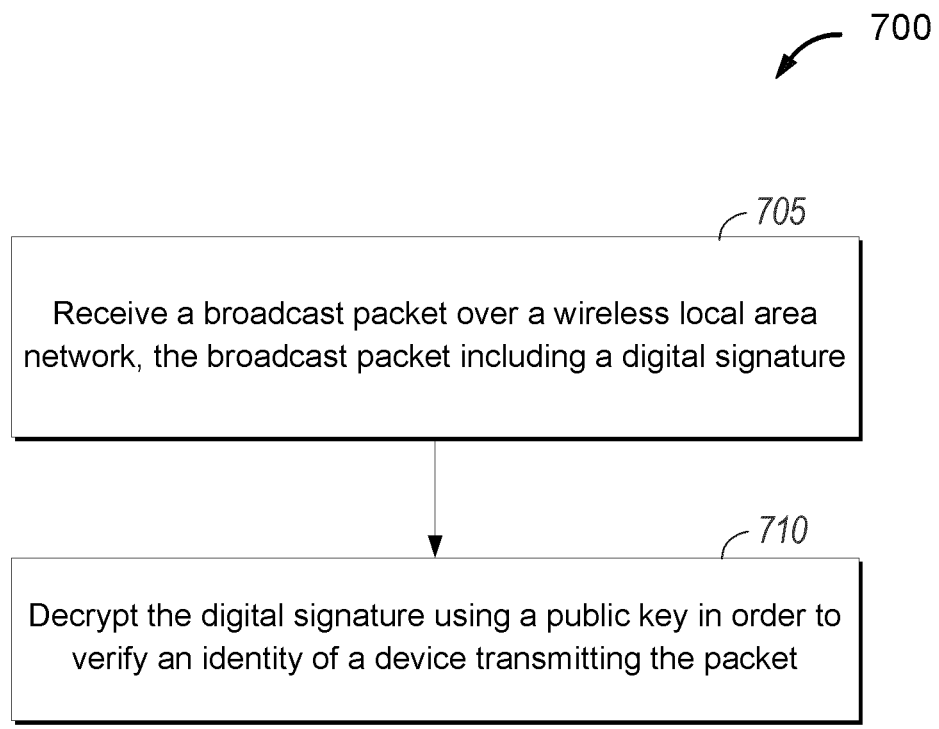
FIG. 7 shows a flow chart of an exemplary method for receiving a packet with message authentication.

FIG. 7 shows a flow chart of an exemplary method for receiving a packet with message authentication. In some aspects, this method may be done by a wireless device such as a STA 106 which is on a network in communication with an AP 104.

At block 705, the STA 106 receives a broadcast packet over a wireless local area network, the broadcast packet including a digital signature. In some aspects, the means for receiving may include a receiver.

At block 710, the STA 106 decrypts the digital signature using a public key in order to verify an identity of a device transmitting the packet. In some aspects, the means for decrypting may include a processor or a receiver.

Figure 8:
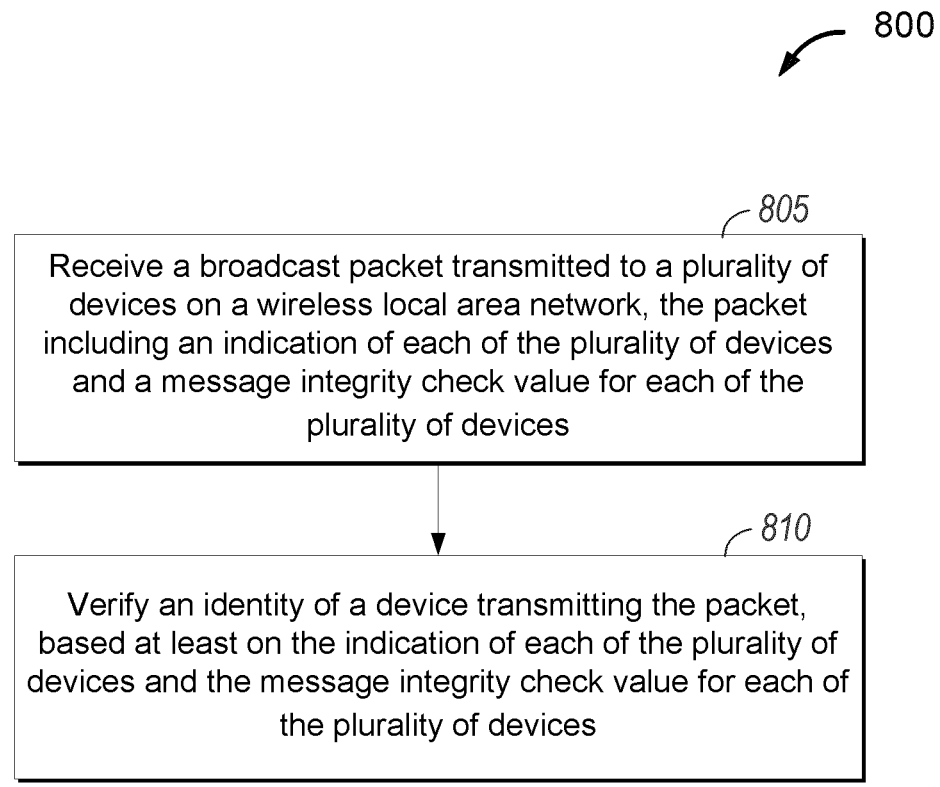
FIG. 8 shows a flow chart of another exemplary method for receiving a packet with message authentication.

FIG. 8 shows a flow chart of an exemplary method for receiving a packet with message authentication. In some aspects, this method may be done by a wireless device such as a STA 106 which is on a network in communication with an AP 104.

At block 805, the STA 106 receives a broadcast packet transmitted to a plurality of devices on a wireless local area network, the packet including an indication of each of the plurality of devices and a message integrity check value for each of the plurality of devices. In some aspects, the means for receiving may include a receiver.

At block 810, the STA 106 verifies an identity of a device transmitting the packet, based at least on the indication of each of the plurality of devices and the message integrity check value for each of the plurality of devices. In some aspects, the means for verifying may include a processor or a receiver. In some aspects, if the identity of the device transmitting the packet cannot be verified, the STA 106 may be configured to transmit an indication indicating an error in the message in the message integrity check value. In some aspects, the means for transmitting may include a transmitter.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication comprising:
   determining at least one of an association identification or a media access control address for each of a plurality of wireless devices;
   determining a message integrity check value for each of the plurality of wireless devices based on a pairwise transient key and sequence number in a counter mode cipher block chaining message authentication code protocol header and the association identification or the media access control address of the wireless device;
   generating a multicast packet comprising, the counter mode cipher block chaining message authentication code protocol header and the message integrity check values for each of the wireless devices of the plurality of wireless devices and the at least one of the determined association identification or the media access control address for each of the wireless devices of the plurality of wireless devices; and
   transmitting the multicast packet to each of the plurality of wireless devices on a wireless local area network.

2. The method of claim 1, wherein the message integrity check value for each of the plurality of wireless devices comprises a shortened message integrity check value of fewer than eight octets.

3. The method of claim 1, wherein the multicast packet includes a frame body, and wherein a data length field is included within the frame body of the multicast packet.

4. The method of claim 1, wherein the multicast packet includes a counter mode cipher block chaining message authentication code protocol header with a flipped reserved bit or flipped reserved combination of bits, the flipped reserved bit or flipped reserved combination of bits configured to allow the plurality of wireless devices to recognize the multicast packet as a multicast packet with sender authentication.

5. The method of claim 1, further comprising:
   receiving an indication from at least one wireless device of the plurality of wireless devices indicating an error in one or more message integrity check values in a second multicast packet received by the at least one wireless device; and
   transmitting a message to one or more wireless devices indicating that the at least one wireless device has discovered the error in the one or more message integrity check values.

6. The method of claim 5, wherein the message comprises instructions to the one or more wireless devices to disable a multicast packet service in the network.

7. The method of claim 5, wherein the message comprises instructions to the one or more wireless devices to alter a unicast key of the one or more wireless devices.

8. The method of claim 1, wherein determining the message integrity check value of the wireless device comprises generating a first message integrity check value by encrypting data in the multicast packet with a group temporal key, and then determining a message integrity check value for each of the plurality of wireless devices based on the first message integrity check value.

9. A wireless communication apparatus comprising:
   a transmitter configured to:
      determine at least one of an association identification or a media access control address for each of a plurality of wireless devices,
      determine a message integrity check value for each of the plurality of wireless devices based on a pairwise transient key and sequence number in a counter mode cipher block chaining message authentication code protocol header and the association identification or the media access control address of the wireless device;
      generate a multicast packet comprising, the counter mode cipher block chaining message authentication code protocol header and the message integrity check values for each of the wireless devices of the plurality of wireless devices and the at least one of the determined association identification or the media access control address for each of the wireless devices of the plurality of wireless devices, and
      transmit the multicast packet to each of the plurality of wireless devices on a wireless local area network.

10. The apparatus of claim 9, wherein the message integrity check value for each of the plurality of wireless devices comprises a shortened message integrity check value of fewer than eight octets.

11. The apparatus of claim 9, wherein the multicast packet includes a frame body, and wherein a data length field is included within the frame body of the multicast packet.

12. The apparatus of claim 9, wherein the multicast packet includes a counter mode cipher block chaining message authentication code protocol header with a flipped reserved bit or flipped reserved combination of bits, the flipped reserved bit or flipped reserved combination of bits configured to allow the plurality of wireless devices to recognize the multicast packet as a multicast packet with sender authentication.

13. The apparatus of claim 9, further comprising:
   a receiver configured to receive an indication from at least one wireless device of the plurality of wireless devices indicating an error in one or more message integrity check values in a second multicast packet received by the at least one wireless device; and
   the transmitter further configured to transmit a message to one or more wireless devices indicating that the at least one wireless device has discovered the error in the one or more message integrity check values.

14. The apparatus of claim 13, wherein the message comprises instructions to the one or more wireless devices to disable a multicast packet service in the network.

15. The apparatus of claim 13, wherein the message comprises instructions to the one or more wireless devices to alter a unicast key of the one or more wireless devices.

16. The apparatus of claim 9, wherein determining the message integrity check value of the wireless device comprises generating a first message integrity check value by encrypting data in the multicast packet with a group temporal key, and then determining a message integrity check value for each of the plurality of wireless devices based on the first message integrity check value.

17. A wireless communication apparatus comprising:
    means for determining at least one of an association identification or a media access control address for each of a plurality of wireless devices;
    means for determining a message integrity check value for each of the plurality of wireless devices based on a pairwise transient key and sequence number in a counter mode cipher block chaining message authentication code protocol header and the association identification or the media access control address of the wireless device
    means for generating a multicast packet comprising, the counter mode cipher block chaining message authentication code protocol header and the message integrity check values for each of the wireless devices of the plurality of wireless devices and the at least one of the determined association identification or the media access control address for each of the wireless devices of the plurality of wireless devices; and
    means for transmitting the multicast packet to each of the plurality of wireless devices on a wireless local area network.

18. The apparatus of claim 17, wherein the message integrity check value for each of the plurality of wireless devices comprises a shortened message integrity check value of fewer than eight octets.

19. The apparatus of claim 17, further comprising:
    means for receiving an indication from at least one wireless device of the plurality of wireless devices indicating an error in one or more message integrity check values in a second multicast packet received by the at least one wireless device; and
    means for transmitting a message to one or more wireless devices indicating that the at least one wireless device has discovered the error in the one or more message integrity check values.

20. The apparatus of claim 19, wherein the message comprises instructions to the one or more wireless devices to disable a multicast packet service in the network or alter a unicast key of the one or more devices.

21. A non-transitory, computer readable medium comprising instructions that when executed cause a processor in a device to perform a method for wireless communication, the method comprising:
    determining at least one of an association identification or a media access control address for each of a plurality of wireless devices;
    determining a message integrity check value for each of the plurality of wireless devices based on a pairwise transient key and sequence number in a counter mode cipher block chaining message authentication code protocol header and the association identification or the media access control address of the wireless device;
    generating a multicast packet comprising, the counter mode cipher block chaining message authentication code protocol header and the message integrity check values for each of the wireless devices of the plurality of wireless devices and the at least one of the determined association identification or the media access control address for each of the wireless devices of the plurality of wireless devices; and
    transmitting the multicast packet to each of the plurality of wireless devices on a wireless local area network.

22. The computer readable medium of claim 21, wherein the message integrity check value for each of the plurality of wireless devices comprises a shortened message integrity check value of fewer than eight octets.

23. The computer readable medium of claim 21, further comprising:
    receiving an indication from at least one wireless device of the plurality of wireless devices indicating an error in one or more message integrity check values in a second multicast packet received by the at least one wireless device; and
    transmitting a message to one or more wireless devices indicating that the at least one wireless device has discovered the error in the one or more message integrity check values.

24. The computer readable medium of claim 23, wherein the message comprises instructions to the one or more wireless devices to disable a multicast packet service in the network or alter a unicast key of the one or more wireless devices.

* * * * *